United States Patent [19]
Mizushina et al.

[11] Patent Number: 5,142,903
[45] Date of Patent: Sep. 1, 1992

[54] DRIVING POWER SOURCE UNIT FOR AUTOMOTIVE POWER TRANSMISSON TESTING APPARATUS EMPLOYING MOTOR

[75] Inventors: Fumio Mizushina; Takashi Goto, both of Shizuoka; Michio Nawa, Kanagawa, all of Japan

[73] Assignee: Kabushiki Kaisha Meidensha, Japan

[21] Appl. No.: 731,641

[22] Filed: Jul. 17, 1991

Related U.S. Application Data

[62] Division of Ser. No. 436,342, Nov. 13, 1989, Pat. No. 5,085,071.

[30] Foreign Application Priority Data

Nov. 14, 1988 [JP] Japan .................. 63-148307

[51] Int. Cl.$^5$ .......................... G01M 15/00
[52] U.S. Cl. .................................. 73/118.1
[58] Field of Search ............... 74/661, 665 A, 665 B, 74/342, 344; 73/118.1

[56] References Cited

U.S. PATENT DOCUMENTS

| | | | |
|---|---|---|---|
| 3,575,621 | 4/1971 | Voland et al. | 74/661 |
| 4,159,642 | 7/1979 | Hudson et al. | 73/118.1 |
| 4,823,596 | 4/1989 | Meyers et al. | 73/118.1 |

FOREIGN PATENT DOCUMENTS

| | | | |
|---|---|---|---|
| 0155861 | 7/1932 | Fed. Rep. of Germany | 74/342 |
| 0214554 | 9/1988 | Japan | 74/661 |
| 0115738 | 4/1990 | Japan | 73/118.1 |

*Primary Examiner*—Robert Raevis
*Attorney, Agent, or Firm*—Bachman & LaPointe

[57] ABSTRACT

An step-up gear unit is adapted for realization of an automotive internal combustion engine simulated driving power supply in use with motor such as an electric motor, a hydraulic motor and so forth. The step-up gear unit is connected to at least two motors for selectively outputting driving torque of sole motor and combined torque of both motors for wider capacity range of capacity of engine to simulate. The gear train of the step-up gear is so composed to selectively connect and disconnect the motors to an output gear for selective output of the driving torque.

2 Claims, 9 Drawing Sheets

FIG.13

DRIVING POWER SOURCE UNIT FOR AUTOMOTIVE POWER TRANSMISSON TESTING APPARATUS EMPLOYING MOTOR

This is a division of application Ser. No. 436,342 filed Nov. 13, 1989, now U.S. Pat. No. 5,085,071.

BACKGROUND OF THE INVENTION

1. Field of the Invention

The present invention relates generally to a testing apparatus for a power transmission of an automotive vehicle, which performs endurance testing gear shifting transition characteristics test and so forth. More specifically, the invention relates to a power source unit employing a motor, such as electric motor, hydraulic motor and so forth, as a prime mover and having equivalent acceleration and deceleration characteristics to an automotive internal combustion engine.

2. Description of the Background Art

In the prior art, most transmission testing apparatus employs an automotive internal combustion engine, for which a power transmission to be tested is to be coupled, as a driving power source. The transmission test apparatus performs endurance testing and gear shifting transition testing and so forth. Such conventional testing apparatus have had various problems.

For instance, in order to use the internal combustion engine, various engine accessories, such as a fuel supply system, exhaust system, ignition system and so forth, are required. Furthermore, in order to maintain the clean testing environment, a ventilation system, noise-proof facility and so forth are required. In addition, since the fuel used for the driving the engine has high flashing ability, high attention has to be paid to flashing. Because of various requirements for the facility, cost for the facility and administration become substantially high. Furthermore, setting up the facility requires substantial working times.

The internal combustion engine tends to be influenced by environmental conditions such as atmospheric temperature, atmospheric pressure and so forth, which varies engine output. Therefore, the result of a test can be fluctuated by the engine condition and environmental condition. Therefore, reliability of the test result is at a low level.

Also, since the test is performed by utilizing the engine to be actually used with the transmission, the transmission test cannot be performed unless the actually used engine is provided. Namely, when a new engine and transmission are to be developed, testing of the transmission cannot be performed until the engine designing is completed. Therefore, development of the transmission is always delayed in relation to timing of completion of the engine designing.

In order to solve the foregoing problems, Japanese Patent First (unexamined) Publications (Tokkai) Showa 58-38833 and 61-53541 propose motor powered transmission testing apparatus which employs an electric motor, a hydrostatic motor as driving power source. Such prior proposed motor powered transmission testing apparatus is effective for performing endurance tests and steady state characteristics tests. However, because of much greater inertia moment in the motor, a difficulty is encountered in shifting transition characteristics tests which is important for analysis of shifting shock and enhancing transmission shifting characteristics.

Namely, in case of the electric motor, the inertia moment becomes in excess of ten times of that of the internal combustion engine, as set out in Tokkai Showa 61-53541 set forth above. For avoiding the influence of the substantially large inertia moment of the electric motor, a command value of a current command for the electric motor is corrected for compensating the difference of inertia moment and adapting transition characteristics of driving torque when the set torque varies.

In this case, though the driving torque transition characteristics can be adjusted to be equivalent to that of the actual engine, the revolution speed of the motor fluctuates due to variation of the current command value to make it difficult to obtain transmission shifting transition characteristics data equivalent to that obtained utilizing the actual engine.

On the other hand, in case of the hydrostatic motor which is normally used in combination with a speed increasing device, this generally increases the motor revolution speed twice or three times. By utilizing the speed increasing device, the inertia moment in the driving power source can be reduced. However, the prior proposed hydrostatic motor powered transmission test apparatus is still unsatisfactory in avoiding influence of the inertia moment.

A step-up gear unit is adapted for realization of an automotive internal combustion engine simulated driving power supply in use with motor such as an electric motor, a hydraulic motor and so forth. The step-up gear unit is connected to at least two motors for selectively outputting driving torque of sole motor and combined torque of both motors for wider capacity range of capacity of engine to simulate. The gear train of the step-up gear is so composed to selectively connect and disconnect the motors to an output gear for selective output of the driving torque.

As will be appreciated from the discussion given hereabove, the following power output characteristics may be required for a power source unit to be used as replacement of the internal combustion engine.

First of all, the inertia moment in revolution may have substantial influence for mode of shift shock to be caused in the power transmission. Therefore, unless the inertia characteristics of the power source, such as the motor, is equivalent to that of the engine the inertia moment on the motor has to be significantly reduced.

Secondly, because the motor has substantial mechanical delay in responding to variation of the electric command, one must obtain response characteristics equivalent to that of the engine in relation to the throttle valve angular displacement. Particularly, upon starting of vehicular traveling, the throttle angular displacement becomes substantial. In general, the motor cannot follow such abrupt variation of the commanding value. Therefore, the response characteristics of the motor upon vehicular starting-up becomes far different from that of the engine. Therefore, unless the power output characteristics is adapted to be equivalent to that of the engine, shifting transition characteristics of the transmission cannot be obtained as a reliable data.

SUMMARY OF THE INVENTION

In view of the problems in the prior art, it is a principal object of the present invention to provide a motor powered driving power source unit which can provide equivalent acceleration and deceleration characteristics to an automotive internal combustion engine.

Another object of the invention is to provide a driving power source unit adapted for simulation of wider range of engine capacities.

In order to accomplish aforementioned and other objects, step-up gear unit is adapted for realization of an automotive internal combustion engine simulated driving power supply in use with a motor such as an electric motor, a hydraulic motor and so forth. The step-up gear unit is connected to at least two motors for selectively outputting driving torque of sole motor and combined torque of both motors for wider capacity range of capacity of engine to simulate. The gear train of the step-up gear is so composed to selectively connect and disconnect the motors to an output gear for selective output of the driving torque.

According to one aspect of the invention, a step-up gear unit comprises:

a first input shaft connected to a first power source unit and carrying a first input gear for driving the later;

a second input shaft connected to a second power source unit and carrying a second input gear for driving the later, the second power source unit being independent of the first power source for independently driving the second input gear from the first input gear;

an output shaft connected to a work and carrying a sole output gear for rotation therewith;

a first and second intermediate gears supported on a rotary shaft, the first intermediate gear being adapted to mesh with the first input gear, the second intermediate gear being adapted to mesh with the second input gear, at least one of the first and second intermediate gear being movable for selectively engaging and disengaging with associated one of the first and second input shaft; and a third intermediate gear rigidly secured on the rotary shaft for rotation therewith and constantly meshed with the output gear for driving latter.

The at least one of first and second intermediate gears may be associated with means for permitting axial shifting of the at least one of first and second gears between a first position at which the at least one of first and second intermediate gears is engaged with the associated one of the first and second input gears, and a second position at which the at least one of first and second intermediate gears is axially shifted away from the associated input gear for disconnecting gear train therebetween. Furthermore, the axial shift permitting means comprises spline coupling provided between the at least one of first and second intermediate gears and the rotary shaft.

According to another aspect of the invention, an automotive internal combustion engine simulated driving power source unit comprises:

a first motor;

a second motor; and a step-up gear unit including:

a first input shaft connected to the first motor and carrying a first input gear for driving the later;

a second input shaft connected to the second motor and carrying a second input gear for driving the later, the second motor being independent of the first motor for independently driving the second input gear from the first input gear;

an output shaft connected to a work and carrying a sole output gear for rotation therewith;

a first and second intermediate gears supported on a rotary shaft, the first intermediate gear being adapted to mesh with the first input gear, the second intermediate gear being adapted to mesh with the second input gear, at least one of the first and second intermediate gear being movable for selectively engaging and disengaging with associated one of the first and second input shaft, and a third intermediate gear rigidly secured on the rotary shaft for rotation therewith and constantly meshed with the output gear for driving latter.

According to a further aspect of the invention, a test apparatus for an automotive power train comprises:

a low inertia driving power source means including a first motor, a second motor, and a step-up gear unit, the step-up gear unit including a first input shaft connected to the first motor and carrying a first input gear for driving the later, a second input shaft connected to the second motor and carrying a second input gear for driving the later, the second motor being independent of the first motor for independently driving the second input gear from the first input gear, an output shaft connected to a work and carrying a sole output gear for rotation therewith, a first and second intermediate gears supported on a rotary shaft, the first intermediate gear being adapted to mesh with the first input gear, the second intermediate gear being adapted to mesh with the second input gear, at least one of the first and second intermediate gear being movable for selectively engaging and disengaging with associated one of the first and second input shaft and a third intermediate gear rigidly secured on the rotary shaft for rotation therewith and constantly meshed with the output gear for driving latter;

a first sensor for monitoring revolution speed at the input of the power train for producing an engine speed simulated data;

an engine load setting means for generating an engine load simulated data which is variable according to a desired pattern for testing various mode of operation of the power train;

means for deriving a torque demand for controlling the electric motor on the basis of the engine speed simulated data and the engine load simulated data, the torque demand deriving means having a plurality of torque variation characteristics relative to the engine speed simulated data value, each torque variation characteristics being set with respect to specific engine load simulated data value; and means for controlling the electric motor on the basis of the torque demand for supplying input torque for the power train.

According to a still further aspect of the invention, a transmission testing apparatus comprising:

first and second electric motor;

a step-up gear unit, the step-up gear unit including a first input shaft connected to the first motor and carrying a first input gear for driving the later, a second input shaft connected to the second motor and carrying a second input gear for driving the later, the second motor being independent of the first motor for independently driving the second input gear from the first input gear, an output shaft connected to a work and carrying a sole output gear for rotation therewith, a first and second intermediate gears supported on a rotary shaft, the first intermediate gear being adapted to mesh with the first input gear, the second intermediate gear being adapted to mesh with the second input gear, at least one of the first and second intermediate gear being movable for selectively engaging and disengaging with associated one of the first and second input shaft and a third intermediate gear rigidly secured on the rotary shaft for rotation therewith and constantly meshed with the output gear for driving latter;

a first sensor for monitoring revolution speed at the input of the transmission for producing an engine speed simulated data;

an engine load setting means for generating an engine load simulated data which is variable according to a desired pattern for testing various mode of operation of the transmission; means for storing a plurality of engine torque variation simulated torque variation characteristics relative to the engine speed simulated data value, each torque variation characteristics being set with respect to specific engine load simulated data value;

means for selecting one of the torque variation characteristics in terms of the engine load simulated data and for deriving a torque demand on the basis of the engine speed simulated data according to the selected one of the torque variation characteristics;

means for controlling driving torque transition from a first torque demand to a second torque demand for providing an engine output torque transition simulated torque transition in response to variation of the engine load simulated data value; and means for controlling the electric motor on the basis of the torque demand for supplying input torque for the transmission.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
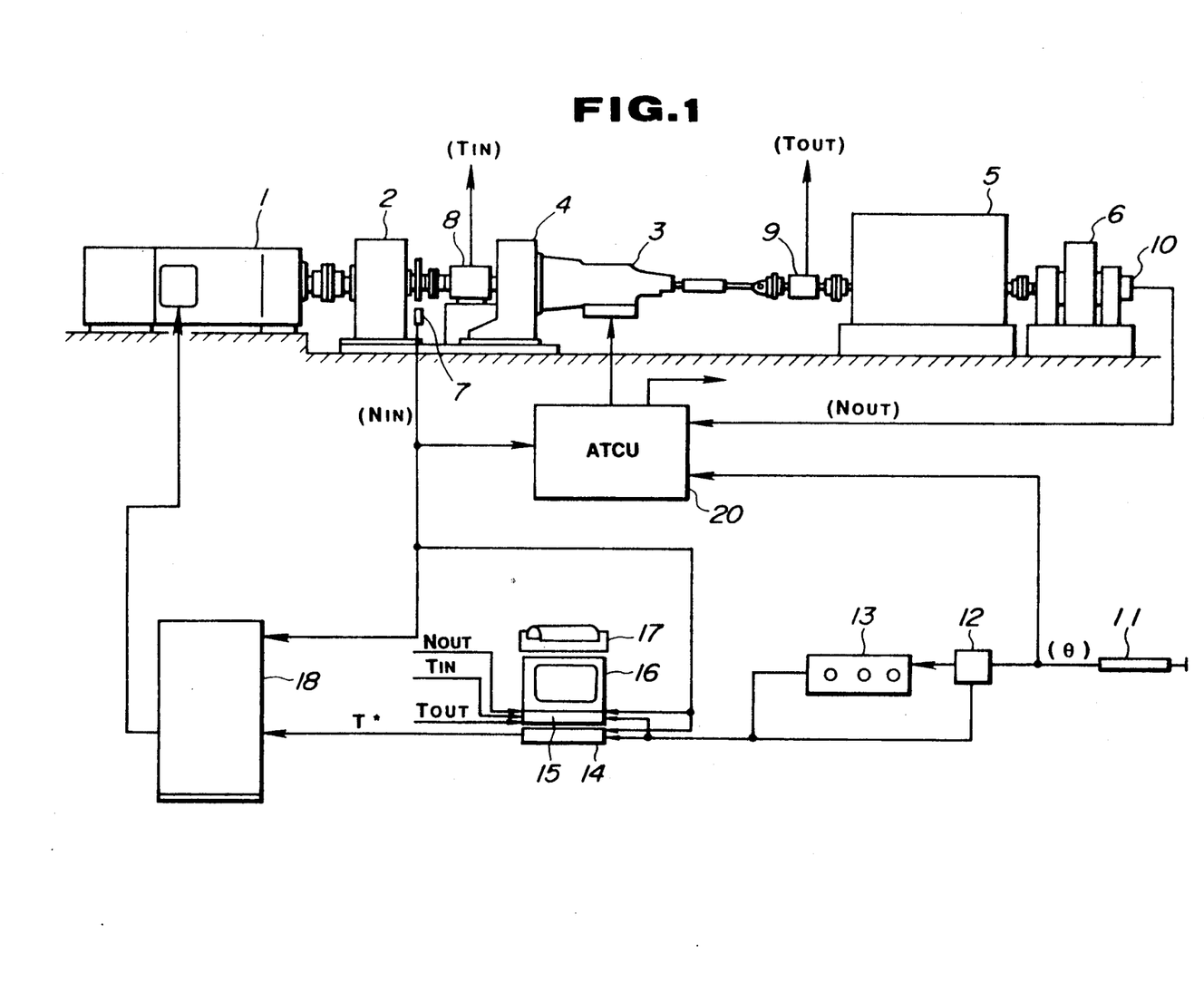
FIG. 1 is a diagrammatical illustration of the first embodiment of a transmission testing apparatus according to the present invention.

Referring now to the drawings, particularly to FIG. 1, the first embodiment of a transmission testing apparatus, according to the present invention, employs a direct current electric motor 1 as a driving power source. The electric motor forms a driving power source unit for providing engine simulated driving power. The electric motor 1 is associated with a step-up gear unit 2 for forming an engine simulated power unit. The electric motor 1 has an output shaft connected to the step-up gear unit 2. Since the electric motor 1 has approximately ten times greater inertia moment than that of an automotive internal combustion engine, the step-up gear unit 2 is set to increase the revolution speed of the motor 1 by ten times so that the motor revolution speed can be reduced to be one tenth of the required revolution speed. By this, the magnitude of the inertia moment of the electric motor 1 can be equivalent to that of the internal combustion engine.

Though FIG. 1 shows a sole motor 1 in the driving power source unit as a prime mover for providing driving power, the shown embodiment may employ a plurality of electric motors so that a selected one of those can supply the driving power according to the capacity of the engine or the power train, such as the transmission to be tested.

The step-up gear unit 2 employs a helical gear arrangement for forming a speed increasing mechanism for increasing the revolution speed of the electric motor 1. If the increasing ratio of the step-up gear unit 2 is too small, the revolution speed of the electric motor 1 cannot be satisfactorily lowered to make reduction of the inertia moment of the motor insufficient. On the other hand, when the increasing ratio of the step-up gear unit 2 is too large, the rated output of the electric motor becomes too large. Therefore, practical range of the increasing ratio of the step-up gear unit is in a range of six times to twenty times.

The output shaft of the step-up gear unit 2 is connected to an automotive power transmission 3 to be tested. The transmission 3 is supported on a support base 4. An output shaft of the transmission 3 is connected to a flywheel unit 5 and a dynamo 6. The flywheel unit 5 and the dynamo 6 form driving load simulating vehicular inertia load, traveling resistance, such as aerodynamic resistance, road resistance and so forth.

A revolution speed sensor 7 and a torque sensor 8 are provided between the step-up gear unit 2 and the power transmission 3. The revolution speed sensor 7 monitors revolution speed at the input of the transmission to produce a sensor signal representative of the revolution speed at the input side of the transmission. The revolution speed sensor 7 will be thus referred to hereafter as "input speed sensor". The sensor signal produced by the input speed sensor 7 will be hereafter referred to as "input speed indicative signal $N_{IN}$". The torque sensor 8 monitors a rotational torque at the input shaft of the transmission 3 to produce a sensor signal representative of the rotational torque at the input shaft of the transmission. Therefore, the torque sensor 8 will be hereafter referred to as "input torque sensor", and the sensor signal output from the input torque sensor will be hereafter referred to as "input torque indicative signal $T_{IN}$".

Another torque sensor 9 is provided for monitoring output torque of the transmission 3 at the output shaft thereof. The torque sensor 9 will be hereafter referred to as "output torque sensor". The output torque sensor 9 generates a sensor signal which will be hereafter referred to as "output torque indicative signal $T_{OUT}$" representative of the rotational torque at the output shaft of the transmission. Also, another revolution speed sensor 10 is provided for monitoring a revolution speed at the output of the dynamo 6 to produce a sensor signal representative of the dynamo output speed. The revolution sensor 10 will be hereafter referred to as "output speed sensor" and the sensor signal produced by the output speed sensor will be hereafter referred to as "output speed indicative signal $N_{OUT}$".

An engine simulated motor control system is associated with the electric motor 1 for controlling the latter for providing an engine simulated characteristics of revolution speed and driving torque. The engine simulated motor control system includes a throttle angle setting arrangement 11. The throttle angle setting arrangement 11 is designed for generating an electric signal simulating an automotive accelerator as an engine speed demand indicative parameter. The electric signal will be hereafter referred to as "throttle angle simulated signal $\theta$". Therefore, the throttle angle setting arrangement 11 is designed for manual or automatic operation for entry of the throttle angle simulated signal $\theta$. The engine simulated motor control system also includes a selector switch 12, a manual lag setting arrangement 13, an engine driving characteristics simulation control unit 14, a data administration unit 15, a data monitor display 16 and a data printer 17. The engine simulated motor control system further includes a motor control unit 18 which controls the electric motor 1.

The selector switch 12 is manually operable for directly connecting the throttle angle setting arrangement 11 to the engine driving characteristics simulation control unit 14, or, in the alternative via the manual lag setting arrangement 13, to provide the throttle angle simulated signal $\theta$. The manual lag setting arrangement 13 includes a delay circuit which is set a delay time in view of actual lag time of engine output variation in response to variation of throttle valve angular position. Therefore, the delay time of the delay circuit may be determined through experiments with respect to respective type of engines to be simulated.

The engine driving characteristics simulation control unit 14 includes a microcomputer. The engine driving characteristics simulated control unit 14 has an engine transition state simulation control section which is so programmed as to derive a target troque $T^*$ on the basis of the throttle angle simulated signal $\theta$ with providing a certain or substantially short lag between variation of the throttle angle simulated signal $\theta$ to variation of the target torque. The engine driving characteristics simulation control unit 14 also receives the input speed indicative signal $N_{IN}$ from the input speed sensor 7.

Figure 5:
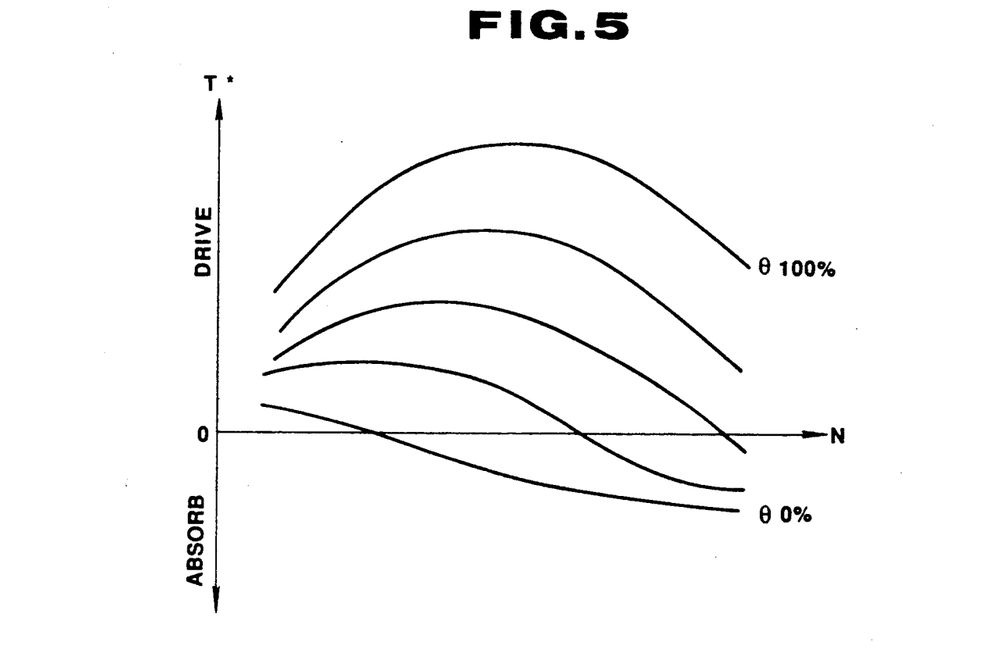
FIG. 5 is a chart showing variation of an engine output characteristics.

The engine driving characteristics simulated control unit 14 has a memory (not clearly shown) storing a three dimensional engine characteristics map of the target torque $T^*$ and the input speed $N_{IN}$ which is to be read in terms of the value of the throttle angle simulated signal $\theta$, as shown in FIG. 5. In FIG. 5, a plurality of characteristics lines are illustrated to represent the three dimensional map. Each characteristics line shows variation of the target torque $T^*$ and the input speed $N_{IN}$ at a corresponding throttle angular position $\theta$. Therefore, the uppermost characteristics line represents the target engine simulated motor output torque $T^*$ and the engine simulated input speed $N_{IN}$ at the maximum throttle angle simulated signal value $\theta_{100\%}$ which represents the throttle valve fully open position. On the other hand, the lowermost characteristics line represents the target engine simulated motor output torque $T^*$ and the engine simulated input speed $N_{IN}$ at the minimum throttle angle simulated signal value $\theta_{0\%}$ which represents the throttle valve fully closed position.

Figure 6A:
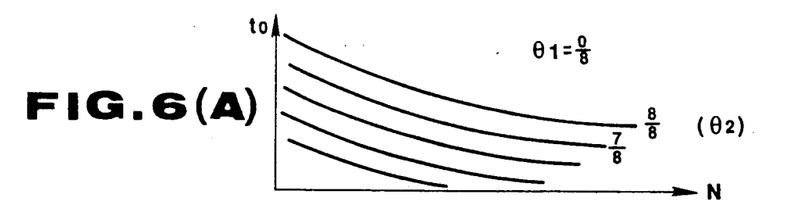
FIGS. 6(A), 6(B) and 6(C) show maps of delay time.
Figure 6B:
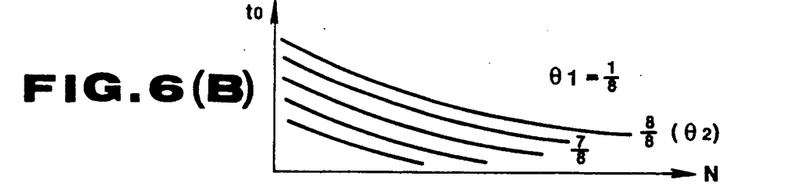
Figure 6C:
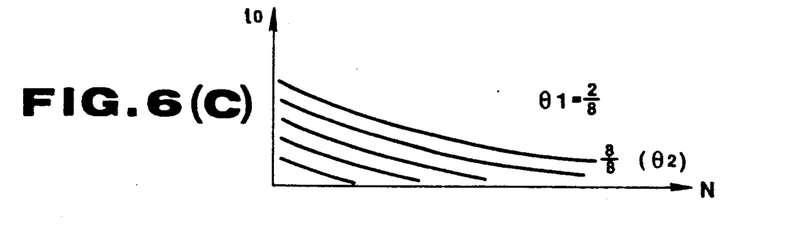

The engine driving characteristics simulation control unit 14 also has lag time maps as illustrated in FIGS. 6(A), 6(B) and 6(C) which are to be accessed or read in terms of the throttle angle command signal $\theta^*$ which is derived on the basis of the throttle angle simulated signal $\theta$ and will be discussed later.

The data administration unit 15 is so programmed to govern data distribution for the data monitor 16 and the data printer 17. For this data administration unit 15, the input speed indicative signal $N_{IN}$, the throttle angle simulated signal $\theta$, the output speed indicative signal $N_{OUT}$, the input torque indicative signal $T_{IN}$ and the output torque indicative signal $T_{OUT}$. Also, for the data administration unit 15, a transmission control unit 20 which controls shift position of the power transmission 3 to be tested and thus is designed to produce shift control signals. In case that the power transmission to be tested is an automatic power transmission, the shift control signal is a selector position simulated signal representative of a position of a selector of the automatic transmission. On the other hand, if the power transmission to be tested is a manual power transmission, the shift control signal is a shift position simulated signal representative of the position of a manual shift lever. In the latter case, the test apparatus may be required to facilitate a clutch or so forth which selectively connect and the disconnect the step-up gear unit 2 in synchronism with shifting operation in the transmission. The shift control signal produced by the transmission control unit 20 is also supplied to the data administration unit 15.

The data administration unit 15 selectively distribute parameter data set forth above to the data display unit 16 and the data printer unit 17 for displaying test data or for printing the test data. The data handled by the data display unit 16 and the data printer unit 17 may be the throttle angle data $\theta$, the input speed data $N_{IN}$ which serves as an engine revolution speed simulated data, the output speed data $N_{OUT}$ which serves as a vehicle speed simulated data, the input and output torque data $T_{IN}$ and $T_{OUT}$ and the shift control data indicative of the transmission gear position.

The engine driving characteristics simulation control unit 14 supplies the target torque indicative signal $T^*$ to the motor control unit 18. The motor control unit 18 also receives the input speed indicative signal $N_{IN}$. The motor control unit 18 has a torque simulation control program for deriving a commanded current value I which representative of a direct current value to be supplied to the motor 1.

The transmission control unit 20 is generally designed for producing a shift control signal representative of the selector position of the automatic power transmission or, in the alternative, of the manual shift position of the shift lever of the manual transmission. In the former case, the selector position indicative shift control signal may represent the selector position which is variable between 1 range position selecting first gear ratio, 2 range position selecting second gear ratio and allowing automatic shifting between first gear ratio and second gear ratio, D range position selecting automatic gear ratio selection between first, second and third gear positions, OD range position selecting over-drive gear ratio allowing shifting to fourth (over-drive) gear ratio, N range selecting neutral gear position, R range selecting reverse clutch engaging position and P range selecting parking position. On the other hand, in case of the manual transmission, the shift control signal may represent first gear position, second gear position, third gear position, fourth gear position, fifth gear position and reverse gear position. In the later case, an appropriate actuator may be provided in the test apparatus for performing shifting operation for the manual transmission in response to the shift control signal.

However, in the modern automatic power transmission, electronic gear ratio control is facilitated. In such electronically controlled automatic power transmission, a microprocessor-based control unit is provided for facilitating driving condition dependent transmission gear ratio selection. In case that the transmission to be tested is the electronically controlled automatic transmission, the transmission control unit 20 has to serve as the control unit. For facilitating capability of simulation of automatic control as that performed by the vehicular transmission control unit, the transmission control unit 20 is connected to the input speed sensor 7 to receive therefrom the input speed indicative signal $N_{IN}$ as the engine speed simulated data, to the output speed sensor 10 to receive therefrom the output speed indicative signal $N_{OUT}$ as the vehicular speed simulated data, and to the throttle angle setting arrangement to receive therefrom the throttle angle simulated signal $\theta$. The transmission control unit 20 is so programmed to process the aforementioned input data for deriving the transmission gear position according to a predetermined gear shifting pattern.

Figure 2:
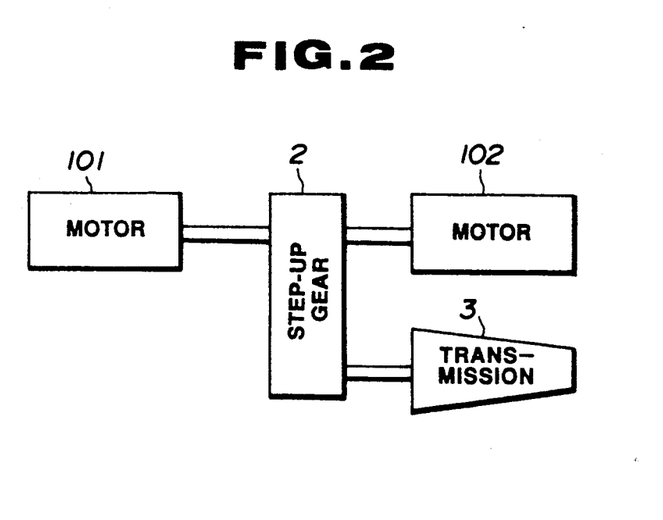
FIG. 2 is brief illustration of a preferred construction of the preferred embodiment of a driving power source unit to be employed in the transmission testing apparatus of FIG. 1.
Figure 3:
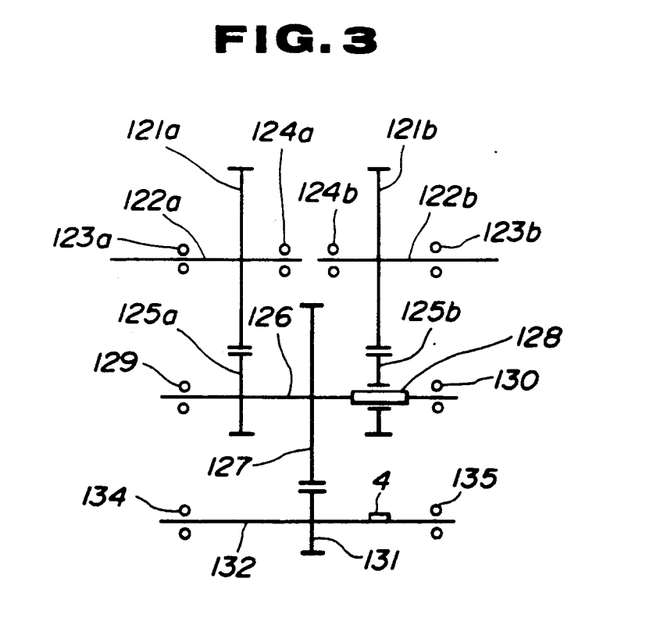
FIG. 3 is a diagrammatical illustration of step-up gear unit employed in the preferred embodiment of the driving power source unit of FIG. 2.

As shown in FIG. 2, the shown embodiment employs a dual motor layout in the driving power source unit, which employs two and mutually different capacities of direct current employs two and mutually different capacities of direct current electric motors 101 and 102. Both of the motors 101 and 102 are connected to a step-up gear unit 2. In order to accept two inputs from the motors 101 and 102, the step-up gear unit 2 is provided with two input shafts 122a and 122b, as shown in FIG. 3. Respective of input shafts 122a and 122b are rotatably supported by means of bearings 123a, 123b, 124a and 124b. A first input gear 121a is rigidly secured on the input shaft 122a for co-rotation therewith. A second input gear 121b is rigidly secured on the input shaft 122b for co-rotation therewith. First and second intermediate gears 125a and 125b are respectively meshed with the first and second input gears 121a and 121b. The first and second intermediate gears 125a and 125b are commonly supported on a rotary shaft 126 which is rotatably supported by means of bearings 129 and 130. As can be seen, the first intermediate gear 125a is rigidly secured on the rotary shaft 126 for rotation therewith. On the other hand, the second intermediate gear 125b is secured on the rotary shaft 126 via a spline coupling 128. The spline coupling 128 is composed of an internal spline gear formed on the inner circumference of the second intermediate gear and an external spline gear formed on the outer circumference of the rotary shaft. With this spline coupling 128, the second intermediate gear 125b is axially movable toward and away from the second input gear 121b for establishing and releasing meshing engagement therebetween.

A third intermediate gear 127 is also rigidly secured on the rotary shaft 126 for rotation therewith. The third intermediate gear 127 is meshed with an output gear 131 which is supported on an output shaft 132 rotatably supported by means of bearings 134 and 135. To the output shaft 132, a later-mentioned torque sensor 8 which comprises a strain gage is associated for monitoring the output torque of the step-up gear unit.

With the shown construction, relatively small capacity of automotive engine is simulated by sole motor 101. In such case, the second intermediate gear 125b is shifted away from the second input shaft for disconnecting the gear train therebetween. As a result, only driving torque supplied from the electric motor 101 can be transmitted to the output shaft 132 at a stepped up speed. On the other hand, in order to simulate relatively large capacity of automotive engine, the spline coupling is operated to mesh the second intermediate gear 125b with the second input gear 121b. As a result, driving torque of both of the electric motors 101 and 102 are supplied to the output shaft 132.

Therefore, with the shown construction of the driving power source unit, wider capacity range of automotive engine can be simulated. It should be noted that the step-up gear unit increases the motor speed for about six to ten times in order to obtain substantially equivalent inertia characteristics to that of the automotive engine.

It should be further appreciated that though the shown embodiment of the step-up gear unit employs a pair of motors arranged to selectively transmit driving torque of one of motors or of both of motors, it may be possible to provide spline coupling for the first intermediate gear so as to establish and release meshing engagement with the first input gear and to employ mutually different capacity of motors for simulating further wider capacity range of automotive engines. For instant, assuming the first electric motor is provided smaller power output capacity than the second electric motor, the minimum driving capacity can be obtained by driving the gear train solely by the first motor, the greater driving capacity can be obtained by driving the gear train solely by the second motor, and the maximum capacity can be obtained by combination of the first and second motors.

The operation of the transmission testing apparatus as set forth above will be discussed herebelow in terms of testing of the automatic power transmission adapted for electronic automatic control.

Figure 4:
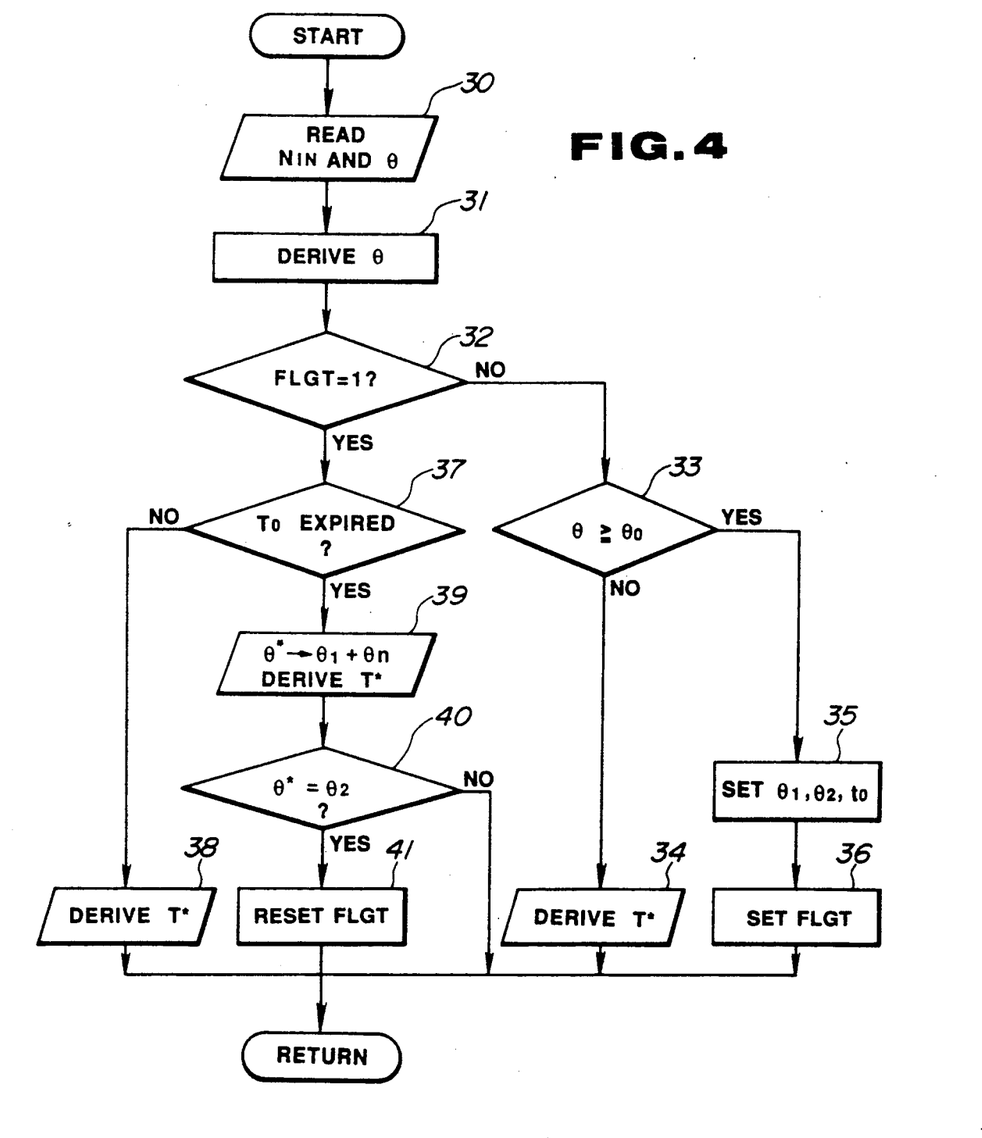
FIG. 4 is a flowchart showing process of engine transition state simulated motor control performed in the first embodiment of the transmission testing apparatus of FIG. 1.

Performance test of the automatic power transmission is performed by adjusting the throttle valve simulated signal value $\theta$. In the testing operation, the engine driving characteristics simulation control unit 14 performs operation as illustrated in FIG. 4. The operation of the engine driving characteristics simulated control unit 14 will be discussed herebelow with reference to FIG. 4. The shown program may be executed periodically or cyclically with a predetermined time interval.

As soon as starting execution, the input speed indicative data $N_{IN}$ and the throttle angle simulated signal $\theta$ are read out at a step 30. At a step 31, a throttle valve angular variation rate $\theta$ is derived. Derivation of the throttle valve angular variation rate $\theta$ is performed by deriving differentiated value of the instantaneous throttle angle simulated signal value and the throttle angle simulated signal value read in the immediately preceding cycle or predetermined cycles ahead.

At a step 32, an engine transition state indicative flag FLGT is checked, which flag is set while the engine transition state simulation is performed and is rest while the engine transition state simulation is performed. If the engine transition state indicative flag FLGT is reset and thus the answer at the step 32 is negative, the throttle valve angular variation rate $\theta$ is compared with a preset throttle angular variation threshold $\theta_0$ at a step 33. When the throttle valve angular variation rate $\theta$ is smaller than the throttle angular variation threshold $\theta_0$, the throttle angle simulated signal value $\theta$ is set as the throttle angle command value $\theta^*$ at a step 34. Also, at the step 34, map look-up is performed in terms of the throttle angle command value $\theta^*$ and the input speed indicative data $N_{IN}$ in order to perform the target torque $T^*$. After process at the step 34, process goes END.

On the other hand, if the throttle valve angular variation rate $\theta$ is greater than or equal to the throttle angular variation threshold $\theta_0$ as checked at the step 33, then, a lag time $t_0$ is derived at a step 35. The lag time $t_0$ is derived on the basis of the throttle angle simulated signal value $\theta$ read at the current execution cycle and being set as the throttle angle command value $\theta_2$ and the throttle angle simulated signal value $\theta$ read at the preceding execution cycle and being set as the throttle angle command value $\theta_1$. Based on the throttle angle command values $\theta_1$ and $\theta_2$, map look-up is performed against the maps illustrated in FIGS. 6(A), 6(B) and 6(C).

It should be appreciated that the lag time $t_0$ is derived for adapting the transition characteristics of the motor to the automotive engine transition characteristics. Therefore, the lag time $t_0$ is set to be greater according to increasing of the difference between the throttle angle command values $\theta_1$ and $\theta_2$. On the other hand, the lag time $t_0$ is set to be smaller according to increasing the throttle angle command value $\theta_1$.

After setting the lag time $t_0$, the engine transition state indicative flag FLGT is set at a step 36. Then, at the step 36, a timer counter (not shown) for counting up a clock for measuring an elapsed time is triggered. After the process at the step 36, process goes END.

On the other hand, when the engine transition state indicative flag FLGT is set as checked at the step 32, the timer counter value is checked whether the lag time $t_0$ is expired or not at a step 37. If the timer counter value is smaller than the lag time $t_0$, the target torque $T^*$ is derived on the basis of the throttle angle command value $\theta_1$ and the input speed indicative signal value $N_{IN}$ by map look-up, at a step 38. After the process at the step 38, process goes to END.

On the other hand, when the timer counter value is greater than or equal to the lag time $t_0$, the throttle angle command value $\theta^*$ is derived by adding a given value $\theta_n$ to the throttle angle command value $\theta_1$, at a step 39. The given value $\theta_n$ is represents transition characteristics in variation of the throttle valve angular position and variation characteristics of the output torque simulated to that of the engine. Therefore, the given value may be variable depending upon the difference between the throttle angle command values $\theta_1$ and $\theta_2$. Namely, when the throttle angle command value $\theta_1$ is smaller than the throttle angle command value $\theta_2$, the given value $\theta_n$ becomes positive value. On the other hand, when the throttle angle command value $\theta_1$ is greater than the throttle angle command value $\theta_2$, the given value $\theta_n$ becomes negative value. At the step 39, the target torque $T^*$ is also derived in terms of the throttle angle command value $\theta^*$ and the input speed indicative value $N_{IN}$ by map look-up.

After process at the step 39, the throttle angle command value $\theta^*$ is compared with the throttle angle command value $\theta_2$ at a step 40. If the throttle angle command value $\theta^*$ is not equal to the throttle angle command value $\theta_2$, the process directly goes to END. On the other hand, when the throttle angle command value $\theta^*$ becomes equal to the throttle angle command value $\theta_2$, the engine transition state indicative flag FLGT is reset at a step 41.

Figure 7:
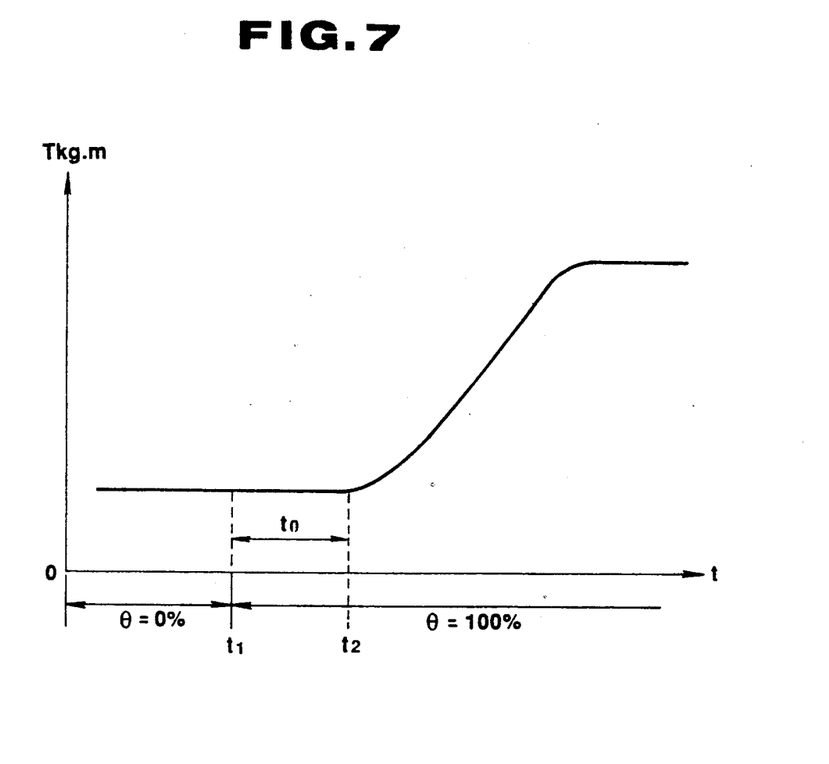
FIG. 7 is a timing chart showing torque variation in engine transition simulated motor in response to engine load variation from an engine idling state to a full load condition.

FIG. 7 shows variation characteristics of the target torque (kg.m) during transition from the engine idling state where the throttle angle command value is minimum $\theta_{0\%}$ ($\theta_1$), to the full load state where the throttle angle command value is maximum $\theta_{100\%}$ ($\theta_2$). As can be seen from FIG. 7, after varying the throttle angle simulated signal value from $\theta_{0\%}$ to $\theta_{100\%}$ at a time $t_1$, the target torque $T^*$ is maintained at a minimum value $T_{MIN}$ corresponding to the minimum throttle angle command value $\theta_{0\%}$ for the lag time $t_0$. At a time $t_2$ after expiration of the lag time $t_0$, the target torque $T^*$ starts to vary toward the maximum $T_{MAX}$ value corresponding to the maximum throttle angle command value $\theta_{100\%}$. As can be appreciated, such variation characteristics of torque may well simulate the response characteristics of the automotive engine during transition from no load state to full load state.

Figure 8:
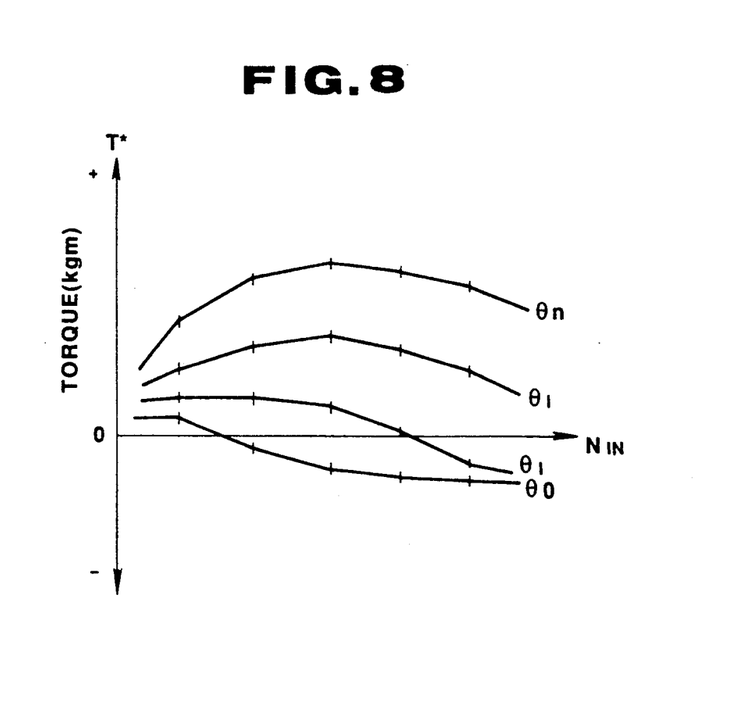
FIG. 8 is a chart showing variation characteristics of target torque in relation to the throttle angle simulated value and the engine speed simulated input speed value, which characteristics is shown in practically formulated form.

In the foregoing process of setting of the target torque $T^*$, it is practical way of formation of the three dimensional map of FIG. 5, by setting a plurality of plots identified by the throttle angle command value $\theta^*$ and the input speed indicative value $N_{IN}$. Therefore, the actual configuration of map becomes as shown in FIG. 8, in which each plot is connected to adjacent plots by a linear line segments. However, in precise, the engine output torque may vary different manner in the range between adjacent plots. Therefore, in order to perform more precise transmission performance test, it is desirable to obtain the target torque value $T^*$ more precisely simulated to that of the actually used automotive engine. Therefore, the engine driving characteristics simulation control unit 14 is provided capability of performing interpolation for deriving the engine output simulated target torque $T^*$ for the range where the throttle angle command value $\theta^*$ and the input speed indicative value $N_{IN}$ do not match with that at any one of the plots in precise sense.

Manner of linear interpolation employed in the preferred embodiment of the transmission testing apparatus according to the invention will be discussed herebelow with reference to FIG. 9. Here, it is assumed that the throttle angle command value is $\theta a$ and the input speed indicative value is Na. In this case, the throttle angle command value $\theta_a$ resides between preset characteristics lines respectively corresponding to the throttle angle command values $\theta_i$ and $\theta_{i+1}$. On the other hand, input speed indicative value Na is between the preset plots A and B on the characteristics line $\theta_i$ and between the plots C and D on the characteristics line $\theta_{i+1}$.

Figure 9:
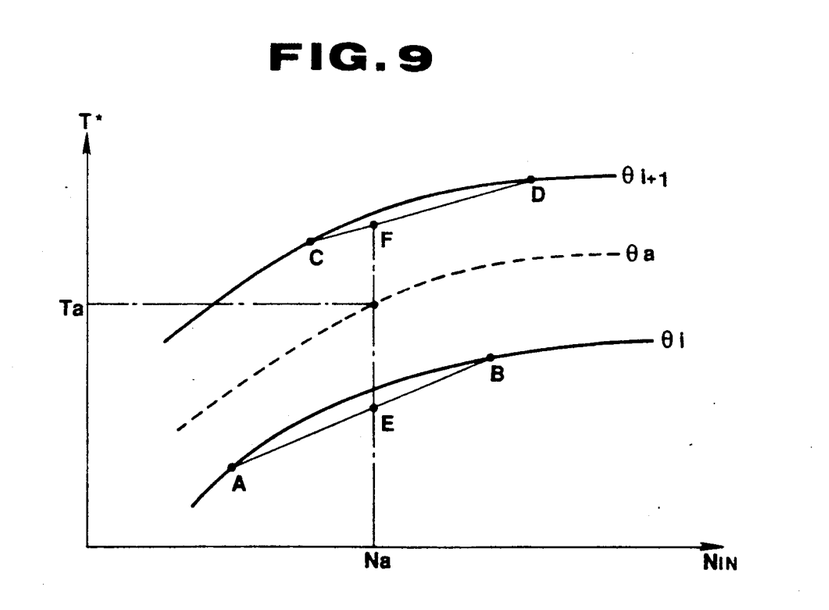
FIG. 9 is a chart showing manner of linear interpolation employed in an engine driving characteristics simulation control unit employed in the test apparatus of FIG. 1.

On the coordinate system of FIG. 9, orientation of respective plots A, B, C and D can be expressed by:

A; $(N_{ij}, T_{ij})$

B; $(N_{ij+1}, T_{ij+1})$

C; $(N_{i+1j}, T_{i+1j})$

D; $(N_{i+1j+1}, T_{i+1j+1})$

Therefore, the orientations E and F on the linear lines AB and CD can be expressed by:

$$T_E = T_{ij} + (T_{ij+1}) \times \frac{Na - N_{ij}}{N_{ij+1} - N_{ij}}$$

$$T_F = T_{i+j} + (T_{i+1j+1} - T_{i+1j}) \times \frac{Na - N_{i+1j}}{N_{i+1j+1} - N_{i+1j}}$$

From the above, the target torque Ta at the throttle angle command value $\theta$a and the input speed indicative value Na can be expressed by:

$$Ta = T_E + (T_F - T_E) \times \frac{\theta - \theta_1}{\theta_{i+1} - \theta_1}$$

Through the foregoing linear interpolation process performed by the engine driving characteristics simulation control unit 14, further precise engine driving characteristics simulation can be realized.

It should be appreciated that through the shown embodiment employs linear interpolation set forth above for performing interpolation, it would be possible to employ method of least squares for performing interpolation. Therefore, the method of interpolation should not be specified to that discussed above.

Figure 12:
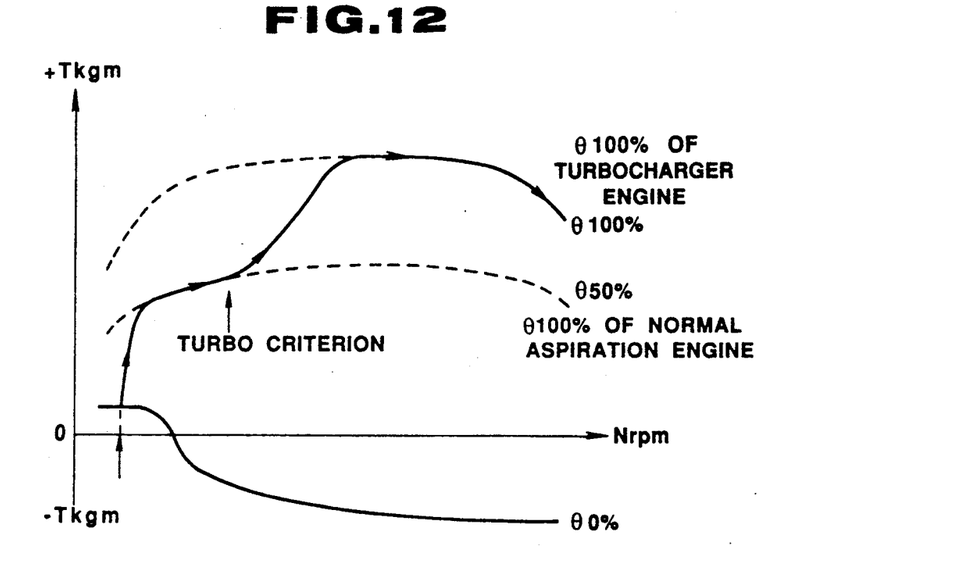
FIGS. 12 and 13 are timing charts showing torque variation in engine transition simulated motor in response to engine load variation from an engine idling state to a full load condition.
Figure 13:
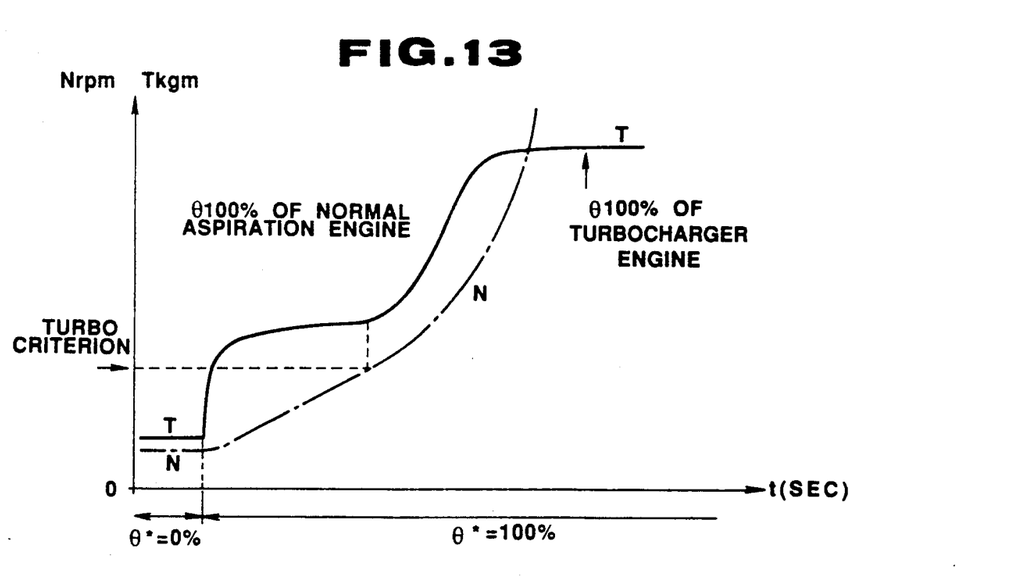

In the meanwhile, in the recent years, various high performance automotive internal combustion engine have been developed. One of typical high performance engines is a supercharged engine, such as the engine having an induction system coupled with a mechanical charger (supercharger) or with a turbocharger. In case of the turbocharged engine, the engine driving characteristics varies significantly depending upon the operating condition of the turbocharger. Namely, when the engine load is relatively low and thus exhaust gas flow rate is not sufficient for making the turbocharger fully active, the engine output torque is held equivalent to that of normal aspiration engine. In contrast to this, at relatively high engine load condition, the exhaust gas flow rate becomes sufficient for fully driving a turbine of the turbocharger. Therefore, compression in an engine combustion chamber becomes higher for providing much higher output torque than that of normal aspiration engine. In addition, in the modern turbocharged engine, a waste gate is provided in the induction system for preventing excess compression in the engine combustion chamber. The waste gate opens at a predetermined intercept point of induction air pressure for maintaining the turbine speed at a predetermined maximum speed. Therefore, as seen from FIGS. 12 and 13, the driving characteristics of the turbocharged engine is much complex that that of the normal aspiration engine.

Since the automotive power transmission is applicable not only for the normal aspiration engine but also for the supercharged engine, the transmission test apparatus has to have capability of performing simulation test adapted for the supercharged engine. In view of this, the engine driving characteristics simulation control unit 14 has to be modified for adaption to the supercharged engines, such as the turbocharged engine.

Figure 10:
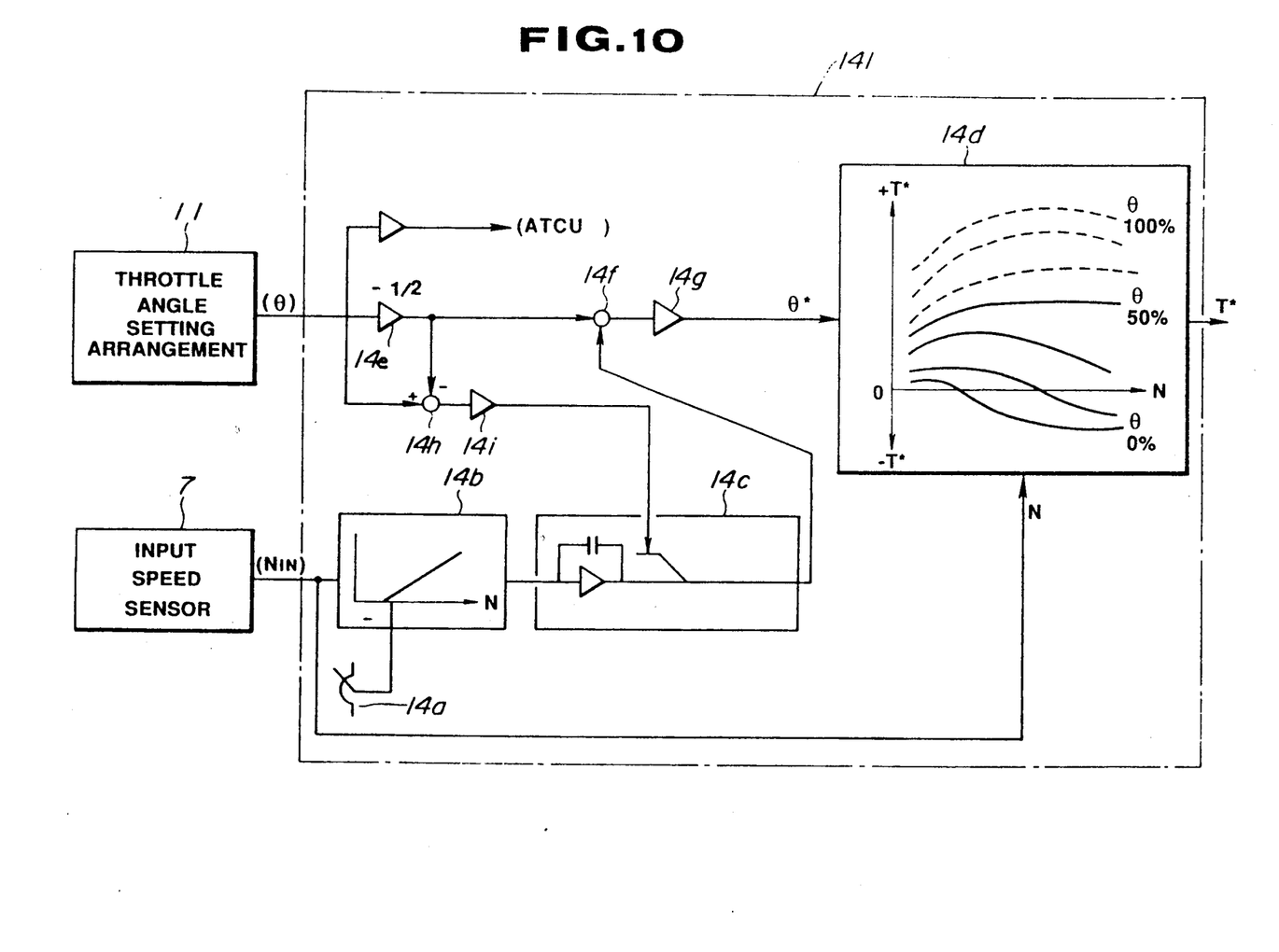
FIG. 10 is a schematic block diagram of the second embodiment of the transmission testing apparatus according to the present invention, which is particularly adapted for testing a power transmission to be coupled with supercharged engine, such as the engine associated with a turbocharger.

FIG. 10 thus shows a circuit of turbocharged engine driving characteristics simulation control section 141 employed in the engine driving characteristics simulation control unit 14 in the former embodiment. The turbocharged engine driving characteristics simulation control section 141 includes a turbocharged engine characteristics starting speed setting switch 14a for manually setting an input speed criterion across which the engine driving characteristics is differentiated between the normal aspiration characteristics and the turbocharged characteristics. The turbocharged engine characteristics starting speed setting switch 14a may be manually adjusted for setting the input speed criterion depending upon the characteristics of the turbocharged engine to be simulated. The turbocharged engine characteristics starting speed setting switch 14a is connected to a turbocharged engine characteristics starting speed circuit 14b which is responsive to the input speed criterion indicative input from the turbocharged engine characteristics starting speed setting switch for setting a reference speed data $N_0$.

The turbocharged engine driving characteristics simulation control section 141 also includes an integrator circuit 14c incorporating a variable limiter, a memory 14d storing a turbocharged engine characteristics map. The map stored in the memory 14d is adapted to be commonly used for deriving the target torque T* for the normal aspiration engine as well as the turbocharged engine. For this, the characteristics line $\theta_{50\%}$ illustrating the engine driving characteristics at half throttle condition of the turbocharged engine, at which the throttle angle simulation signal $\theta$ indicates a value corresponding to the 50% of throttle valve open degree, is used as characteristics line for full load condition of the normal aspiration engine.

The turbocharged engine driving characteristics simulation control circuit 141 has a ½ gain amplifier 14e which is, in turn connected to an adding junction 14f. To the adding junction 14f, the output of the integrator circuit 14c is supplied. The adding junction 14f is supplied to the turbocharged engine characteristics map memory 14d via an amplifier 14g. The throttle angle command signal $\theta$* is derived on the basis of the throttle angle simulated signal $\theta$ with adding the output of the integrator circuit 14c.

On the other hand, the throttle angle simulated signal $\theta$ is also supplied to the integrator circuit 14c via an adding junction 14h and an amplifier 14i for controlling the variable limiter. With the shown arrangement, in case of the normal aspiration engine, since the input to the adding junction 14f from the integrator circuit 14c is held zero, the target torque T* is derived utilizing the characteristics lines illustrated by solid line. On the other hand, in case of the turbocharged engine, since the input is provided to the adding junction 14f from the integrator circuit 14c, the characteristics lines illustrated by broken lines is used for deriving the target torque T*.

Figure 11:
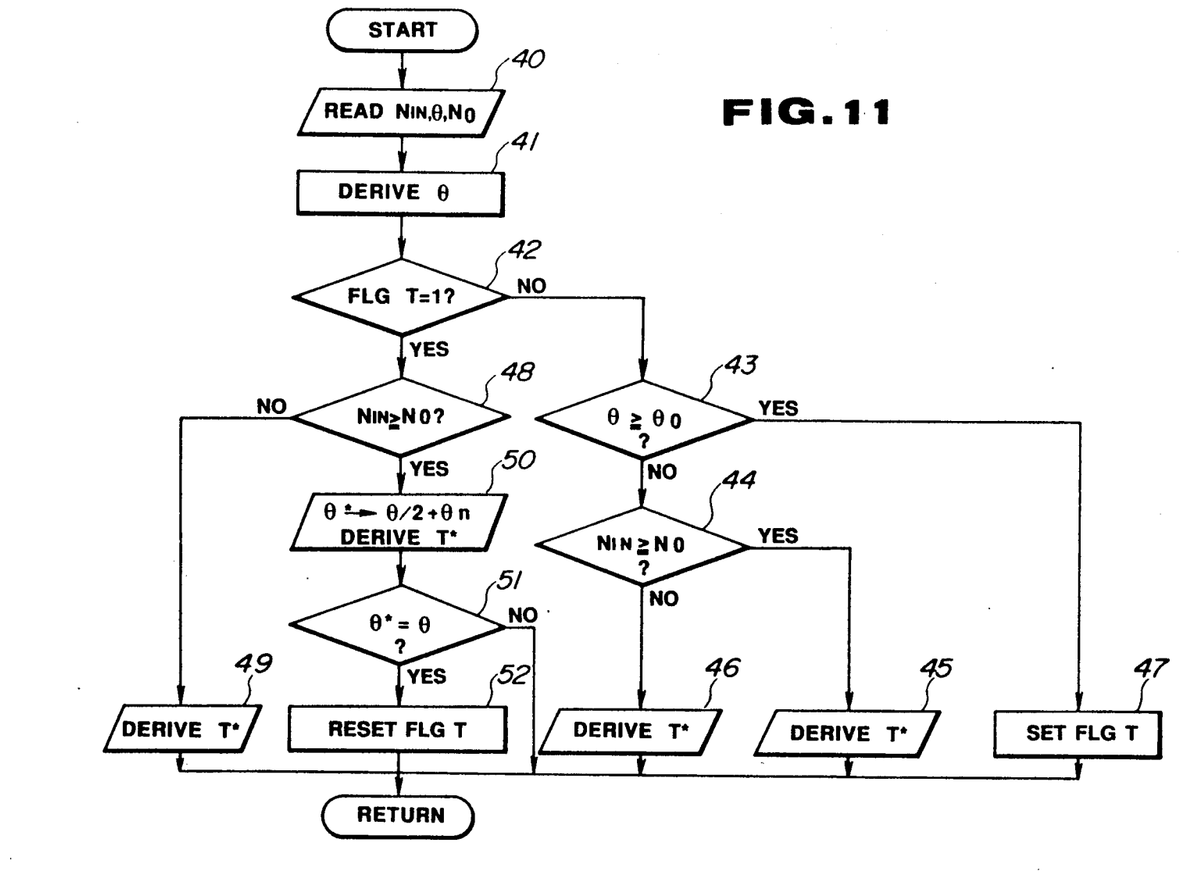
FIG. 11 is a flowchart showing process of engine transition state simulated motor control performed in the engine driving characteristics simulation control system in the second embodiment of the transmission testing apparatus of FIG. 10.

The operation of the engine driving characteristics simulation control circuit 14 in the second embodiment of the transmission testing apparatus according to the present invention will be discussed herebelow with reference to the flowchart of FIG. 11.

At a step 40, the input speed indicative signal $N_{IN}$, the throttle angle simulated signal $\theta$ and the reference speed data $N_0$ are read. At a step 41, a throttle valve angular variation rate $\theta$ is derived. Derivation of the throttle valve angular variation rate $\theta$ is performed by deriving differentiated value of the instantaneous throttle angle simulated signal value and the throttle angle simulated signal value read in the immediately preceding cycle or predetermined cycles ahead.

At a step 42, an engine transition state indicative flag FLGT is checked, which flag is set while the engine transition state simulation is performed and is rest while the engine steady state simulation is performed. If the engine transition state indicative flag FLGT is reset and thus the answer at the step 42 is negative, the throttle valve angular variation rate $\theta$ is compared with a preset throttle angular variation threshold $\theta_0$ at a step 43.

When the throttle angle variation rate $\theta$ is smaller than the throttle angular variation threshold $\theta_0$ as checked at the step 43, the input speed indicative signal $N_{IN}$ is compared with the reference speed data $N_0$ at a step 44. If the input speed indicative signal value $N_{IN}$ is greater than or equal to the reference speed data $N_0$, the throttle angle simulated signal value $\theta$ is set as the throttle angle command value $\theta^*$ for deriving the target torque $T^*$ on the basis of the set throttle angle command value $\theta^*$ and the input speed indicative value $N_{IN}$ at the step 45. On the other than, when the input speed indicative signal value $N_{IN}$ is smaller than the reference speed data $N_0$, half of the throttle angle simulated signal value $\theta$ is set as the throttle angle command value $\theta^*$, at a step 46. At the step 46, the target torque $T^*$ is derived on the basis of the input speed indicative signal value $N_{IN}$.

On the other hand, if the throttle valve angular variation rate $\theta$ is greater than or equal to the throttle angular variation threshold $\theta_0$ as checked at the step 43, then the engine transition state indicative flag FLGT is set at a step 47. Then, at the step 47, a timer counter (not shown) for counting up a clock for measuring an elapsed time is triggered. After the process at the step 47, process goes END.

On the other hand, when the engine transition state indicative flag FLGT is set as checked at the step 42, the input speed indicative signal value $N_{IN}$ is compared with the reference speed data $N_0$ at a step 48. If the input speed indicative value $N_{IN}$ is smaller than the reference speed data $N_0$, the throttle angle simulated signal value $\theta$ is set as the throttle angle command value $\theta^*$ for deriving the target torque $T^*$ on the basis of the set throttle angle command value $\theta^*$ and the input speed indicative value $N_{IN}$ at the step 49. When the input speed indicative value $N_{IN}$ is greater than or equal to the reference speed data $N_0$, the output $\theta_n$ of the integrator circuit 14c is added to the half value ($\theta/2$) of the throttle angle simulated signal value to set the sum value as the throttle angle command value $\theta^*$, at a step 50. Then, the set throttle angle command value $\theta^*$ is compared with the throttle angle simulated value $\theta$ at a step 51. If the throttle angle command value $\theta^*$ is not equal to the throttle angle simulated value $\theta$ as checked at the step 51, the process directly goes END. On the other hand, if the throttle angle command value $\theta^*$ becomes equal to the throttle angle simulated value $\theta$, then the engine transition state indicative flag FLGT is reset at a step 52.

As will be appreciated herefrom, the present invention enables the electric motor to be used as a replacement for an internal combustion engine for performing simulation test of the transmission with engine equivalent revolution and torque variation characteristics. Therefore, according to the present invention, accurate test data can be obtained with utilizing the electric motor.

Therefore, the present invention fulfills all of the objects and advantages sought therefor.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For example, though the shown embodiment utilizes the throttle angle simulated data as the engine load representative data, it may be possible to use other parameters, such as intake vacuum data, intake air flow rate data and so forth, as the engine load representative data. Furthermore, the shown embodiment is applicable for testing not only the power transmission but also various components of automotive power train, such as a final drive gear unit, differential gear box and so forth.

What is claimed is:

1. A test apparatus for an automotive power train comprising:

a low inertia driving power source means including a first motor, a second motor, and a step-up gear unit, said step-up gear unit including a first input shaft connected to said first motor and carrying a first input gear for driving the latter, a second input shaft connected to said second motor and carrying a second input gear for driving the latter, said second motor being independent of said first motor for independently driving said second input gear from said first input gear, an output shaft connected to a work and carrying a sole output gear for rotation therewith, a first and second intermediate gears supported on a rotary shaft, said first intermediate gear being adapted to mesh with said first input gear, said second intermediate gear being adapted to mesh with said second input gear, at least one of said first and second intermediate gear being movable for selectively engaging and disengaging with associated one of said first and second input shaft, and a third intermediate gear rigidly secured on said rotary shaft for rotation therewith and constantly meshed with said output gear for driving latter;

a first sensor for monitoring revolution speed at the input of said power train for producing an engine speed simulated data;

an engine load setting means for generating an engine load simulated data which is variable according to a desired pattern for testing various mode of operation of said power train;

means for deriving a torque demand for controlling said motors on the basis of said engine speed simulated data and said engine load simulated data, said torque demand deriving means having a plurality of torque variation characteristics relative to said engine speed simulated data value, each torque variation characteristics being set with respect to specific engine load simulated data value; and means for controlling said motors on the basis of said torque demand for supplying input torque for said power train.

2. A transmission testing apparatus for an automotive transmission comprising:

first and second electric motor;

a step-up gear unit, said step-up gear unit including a first input shaft connected to said first motor and carrying a first input gear for driving the latter, a second input shaft connected to said second motor and carrying a second input gear for driving the latter, said second motor being independent of said first motor for independently driving said second input gear from said first input gear, an output shaft connected to a work and carrying a sole output gear for rotation therewith, a first and second intermediate gears supported on a rotary shaft, said first intermediate gear being adapted to mesh with said first input gear, said second intermediate gear being adapted to mesh with said second input gear, at least one of said first and second intermediate gear being movable for selectively engaging and disengaging with associated one of said first and second input shaft, and a third intermediate gear rigidly secured on said rotary shaft for rotation therewith and constantly meshed with said output gear for driving the latter;

a first sensor for monitoring revolution speed at the input of said transmission for producing an engine speed simulated data;

an engine load setting means for generating an engine load simulated data which is variable according to a desired pattern for testing various mode of operation of said transmission; means for storing a plurality of engine torque variation simulated torque variation characteristics relative to said engine speed simulated data value, each torque variation characteristics being set with respect to specific engine load simulated data value;

means for selecting one of said torque variation characteristics in terms of said engine load simulated data and for deriving a torque demand on the basis of said engine speed simulated data according to the selected one of said torque variation characteristics;

means for controlling driving torque transition from a first torque demand to a second torque demand for providing an engine output torque transition simulated torque transition in response to variation of said engine load simulated data value; and means for controlling said motors on the basis of said torque demand for supplying input torque for said transmission.

* * * * *